(12) United States Patent
Djeu

(10) Patent No.: US 9,134,177 B2
(45) Date of Patent: Sep. 15, 2015

(54) SELF-REFERENCING FIBER-OPTIC RAMAN PROBE

(71) Applicant: Nicholas Djeu, Tampa, FL (US)

(72) Inventor: Nicholas Djeu, Tampa, FL (US)

( * ) Notice: Subject to any disclaimer, the term of this patent is extended or adjusted under 35 U.S.C. 154(b) by 0 days.

(21) Appl. No.: 13/798,450

(22) Filed: Mar. 13, 2013

(65) Prior Publication Data
US 2014/0268129 A1   Sep. 18, 2014

(51) Int. Cl.
*G01J 3/44*   (2006.01)
*G01J 3/02*   (2006.01)

(52) U.S. Cl.
CPC ................ *G01J 3/44* (2013.01); *G01J 3/0205* (2013.01); *G01J 3/0208* (2013.01); *G01J 3/0218* (2013.01); *G01J 3/0229* (2013.01)

(58) Field of Classification Search
CPC ....... G01N 21/64; G01N 21/65; G01N 21/68; G01N 21/658; G01N 2021/656; G01J 3/02; G01J 3/44
USPC .............................................. 356/301, 72–73
See application file for complete search history.

(56) References Cited

U.S. PATENT DOCUMENTS

| | | | |
|---|---|---|---|
| 5,112,127 A | 5/1992 | Carrabba et al. | |
| 5,381,237 A | 1/1995 | Sela | |
| 7,403,282 B2 | 7/2008 | Silberberg | |
| 7,952,719 B2 | 5/2011 | Brennan, III et al. | |
| 8,027,032 B2 | 9/2011 | Xie | |
| 2007/0088219 A1* | 4/2007 | Xie et al. | 600/473 |
| 2011/0103756 A1* | 5/2011 | Rice et al. | 385/123 |
| 2011/0282166 A1* | 11/2011 | Chen et al. | 600/306 |

FOREIGN PATENT DOCUMENTS

| | | |
|---|---|---|
| EP | 2601514 | 5/2014 |
| GB | 2449343 | 11/2008 |
| WO | WO2011099938 | 8/2011 |

OTHER PUBLICATIONS

Quantitative Raman Spectral Measurements Using a Diamond-Coated All-Silica Fiber-Optic Probe, Haiming Xiao, et al, Applied Spectroscopy, vol. 52, No. 4, 1998.

* cited by examiner

*Primary Examiner* — Abdullahi Nur

(74) *Attorney, Agent, or Firm* — Jerome E Sacks

(57) ABSTRACT

In accordance with the present invention, a novel self-referencing fiber optic Raman probe is disclosed. It uses the Raman signal generated by a crystalline optical fiber to normalize the Raman signal produced by the sample in order to compensate for changes in the output power of the excitation laser light source, the coupling efficiencies of the optical fibers connecting the light source to the probe and the probe to the analyzing spectrometer, and the alignment of optical components within the probe.

2 Claims, 5 Drawing Sheets

SELF-REFERENCING FIBER-OPTIC RAMAN PROBE

CROSS-REFERENCE TO RELATED APPLICATIONS

This application claims the benefit of the U.S. Provisional Patent Application No. 61/641,920 filed May 3, 2012 by the present inventor. This provisional patent application is incorporated herein by reference.

TECHNICAL FIELD

The invention presented herein relates to analytical chemistry, particularly to its practice by use of Raman spectroscopy.

BACKGROUND OF THE DISCLOSURE

In analytical instruments based on Raman spectroscopy, especially the fiber optic variety (M. M. Carrabba and R. D. Rauh, U.S. Pat. No. 5,112,127), the magnitude of the Raman signal detected depends on, among other things, the power delivered by the excitation light source and the alignment of the optical components within the analyzing system. For quantitative measurements, therefore, a reference must be provided which can account for the inevitable variations in these conditions. In an article by H. Xiao et al. (Applied Spectroscopy 52, 626 (1998)), this was accomplished by depositing a diamond film at the end of the fiber optic probe. The Raman signal from the diamond then served as the reference. But the polycrystalline film drastically reduced the optical power incident on the sample. In a second article by X. Zheng et al. (Applied Spectroscopy 55, 382 (2001)), the diamond reference was incorporated in the form of a small single crystal embedded in a glass tip formed at the end of the fiber-optic probe. However, since the diamond particle had to be slightly offset from the main light path in order to avoid excessive scattering, the ratio of the Raman signals from the diamond and the sample still varied with changes in the optical alignment of the system. In yet another article by R. N. Favors et al. (Review of Scientific Instruments 76, 033108 (2005)), the excitation laser beam was made to form two foci, the first of which being situated inside a reference sapphire plate and the second inside the sample. In this case, because the Raman scattering cross section of sapphire is relatively small, a very long data acquisition time was needed in order to produce a useful reference.

Accordingly, what is needed in the art is a self-referencing Raman probe which will overcome the above mentioned deficiencies.

SUMMARY OF THE DISCLOSURE

A Raman probe that utilizes a crystalline optical fiber, e.g., a sapphire ($Al_2O_3$) or YAG ($Y_3Al_5O_{12}$) fiber, as the interface between the probe's internal optics and the sample is herein disclosed. The crystalline optical fiber serves as a conduit for the excitation laser light as well as for the Raman emission signal produced by the sample. Additionally, it generates its own distinct Raman emission signal which can be used to correct for fluctuations in the excitation laser's power, changes in the alignment of the probe's internal optical components, and any disturbance to the input or output optical fibers that are connected to the probe. This is possible because the Raman signals generated by the crystalline optical fiber and by the sample share the same optical path. The large volume provided by the crystalline optical fiber by virtue of its extended length, compared with the focal volume of a free space beam, results in a system wherein the reference Raman signal can be significantly larger than that from the sample.

The crystalline optical fiber can be incorporated in either a rigid form or a flexible form. For process control and laboratory use, a rigid fiber generally will be preferred. However, for the pinpoint positioning of the fiber tip required in applications such as tissue analysis, a thin flexible fiber may be a more appropriate choice.

Additionally, because the probe being disclosed is to be deployed in the contact or proximity mode, the crystalline optical fiber also serves as an effective heat sink due to its high thermal conductivity. This functionality alleviates the excessive heating of absorbing samples often encountered when using conventional Raman probes.

DETAILED DESCRIPTION OF THE DISCLOSURE

Figure 1:
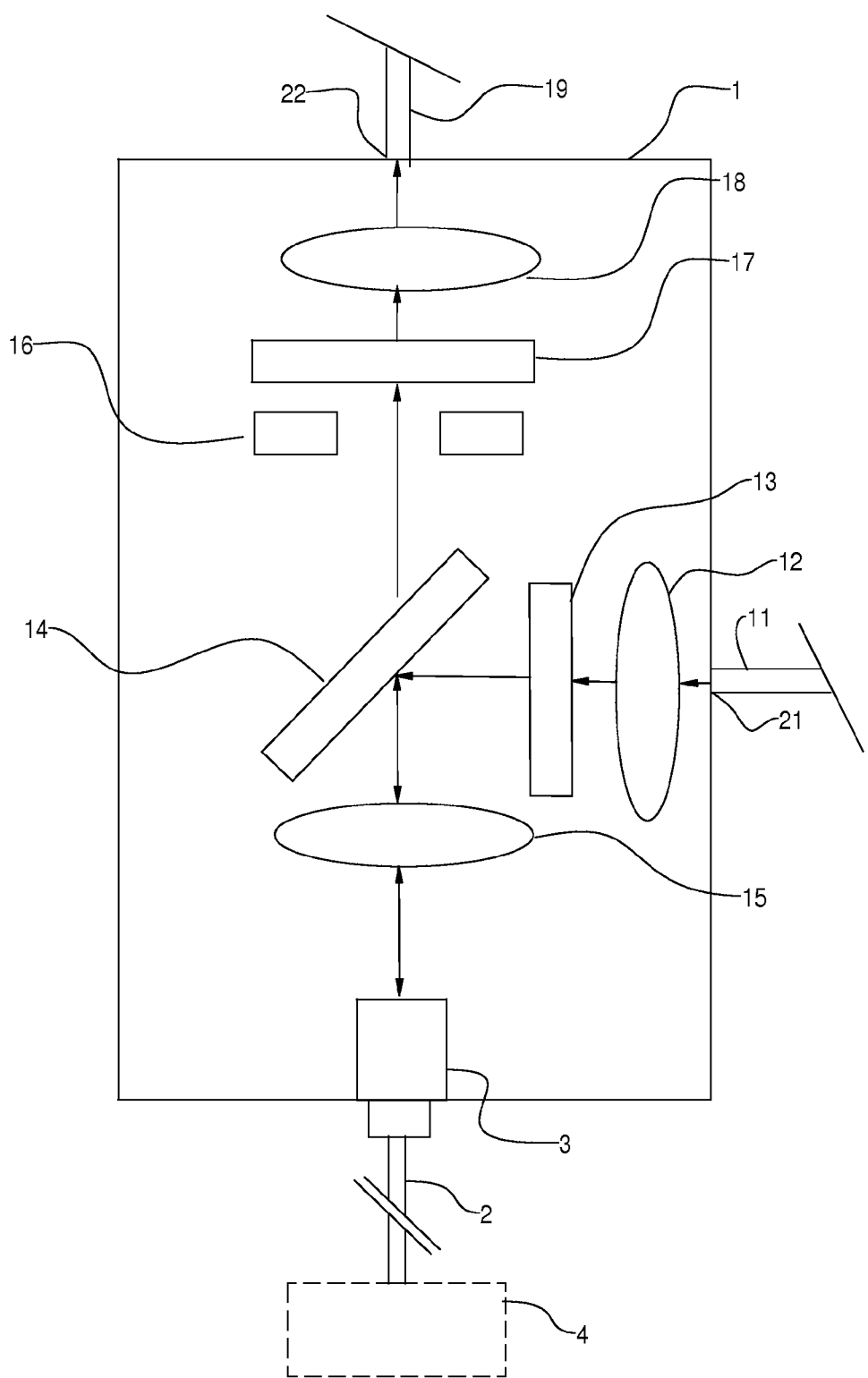
FIG. 1 is a schematic of the first embodiment of a crystalline optical fiber self-referencing Raman probe of the current invention.

As shown in FIG. 1, the first embodiment of the self-referencing fiber-optic Raman probe contains a probe body 1 and a probe head 2, which is an appropriately protected crystalline optical fiber such as a single crystal sapphire ($Al_2O_3$) optical fiber in either a rigid form or a flexible form. The probe head 2 is connected to the probe body 1 through a connector 3 which is permanently attached to the probe body 1, and serves as the interface between the sample 4 and probe body. Thus, the same probe body 1 can be used with any number of probe heads having crystalline optical fibers of varying diameter and length. Also attached to the probe body 1 are an input optical fiber 11 at first port 21 and an output optical fiber 19 at second port 22. The input optical fiber 11 is to be connected to the excitation laser. Similarly, the output optical fiber 19 is to be connected to a spectrometer.

Referring again to FIG. 1, the light from excitation laser is guided by the input optical fiber 11 into the probe body 1 and is collimated by first lens 12. The excitation laser light is next spectrally conditioned by an optional band pass filter 13 to remove any Raman emission produced by the input fiber, if necessary. The excitation laser light is then reflected by a beam splitter 14 onto second lens 15, which focuses it into the crystalline optical fiber probe head 2. The laser light exiting from the crystalline optical fiber is to be made incident on the sample. In the figure, the arrows indicate the flow of the input laser light as well as the Raman emissions through the system.

The probe is applicable to the measurement of Raman emission from samples in all phases. For hard solid samples, obviously only proximity sampling is possible, since complete contact over the entire surface area of the sapphire fiber end cannot be achieved in general. For soft solids such as tissues, however, the probe can be used in the true contact mode. Because the probe being disclosed is to be deployed in the contact or proximity mode, the crystalline optical fiber also serves as an effective heat sink due to its high thermal conductivity. This functionality alleviates the excessive heating of absorbing samples often encountered when using conventional Raman probes. For fluids (gases, liquids, emulsions, slurries, etc.), it is obvious that contact sampling is possible by immersion. However, immersion is not necessary in the case of fluids. Proximity sampling through the transparent wall of a container is also an option, at the expense of reduced signal intensity and diminished heat sinking.

The Raman emission produced by the sample is guided back by the probe head 2 into the probe body 1. After collimation by second lens 15, the Raman emissions from the sample as well as from the crystalline optical fiber are passed through the beam splitter 14. For best results, the latter should be a dichroic beam splitter with high reflectivity at the excitation laser wavelength and high transmissivity at the Raman signal (from the sample as well as the crystalline optical fiber) wavelengths. The emissions are then spatially filtered, if needed, by an optional aperture 16 which blocks any off-axis rays at the laser wavelength. Finally, after passing through a long wave pass filter 17 which rejects light at the laser wavelength and transmits light at longer wavelengths, the Raman emissions are focused by third lens 18 into the output optical fiber 19.

Figure 2:
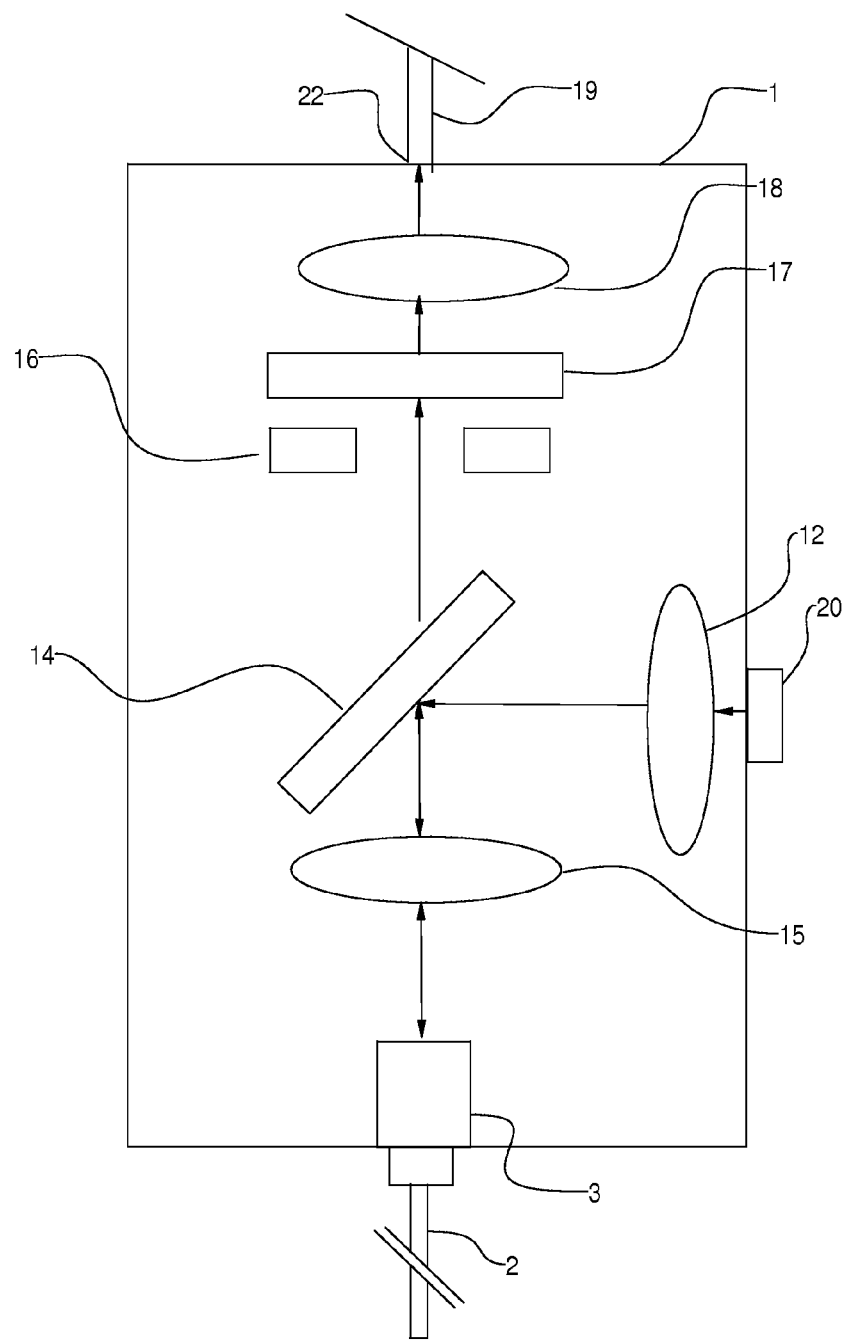
FIG. 2 is a schematic of the second embodiment of a crystalline optical fiber self-referencing Raman probe of the current invention.

In a second embodiment, illustrated in FIG. 2, excitation laser 20 is mounted directly on the probe body and the optional band pass filter 13 is eliminated, with everything else the same as in the first embodiment.

Figure 3:
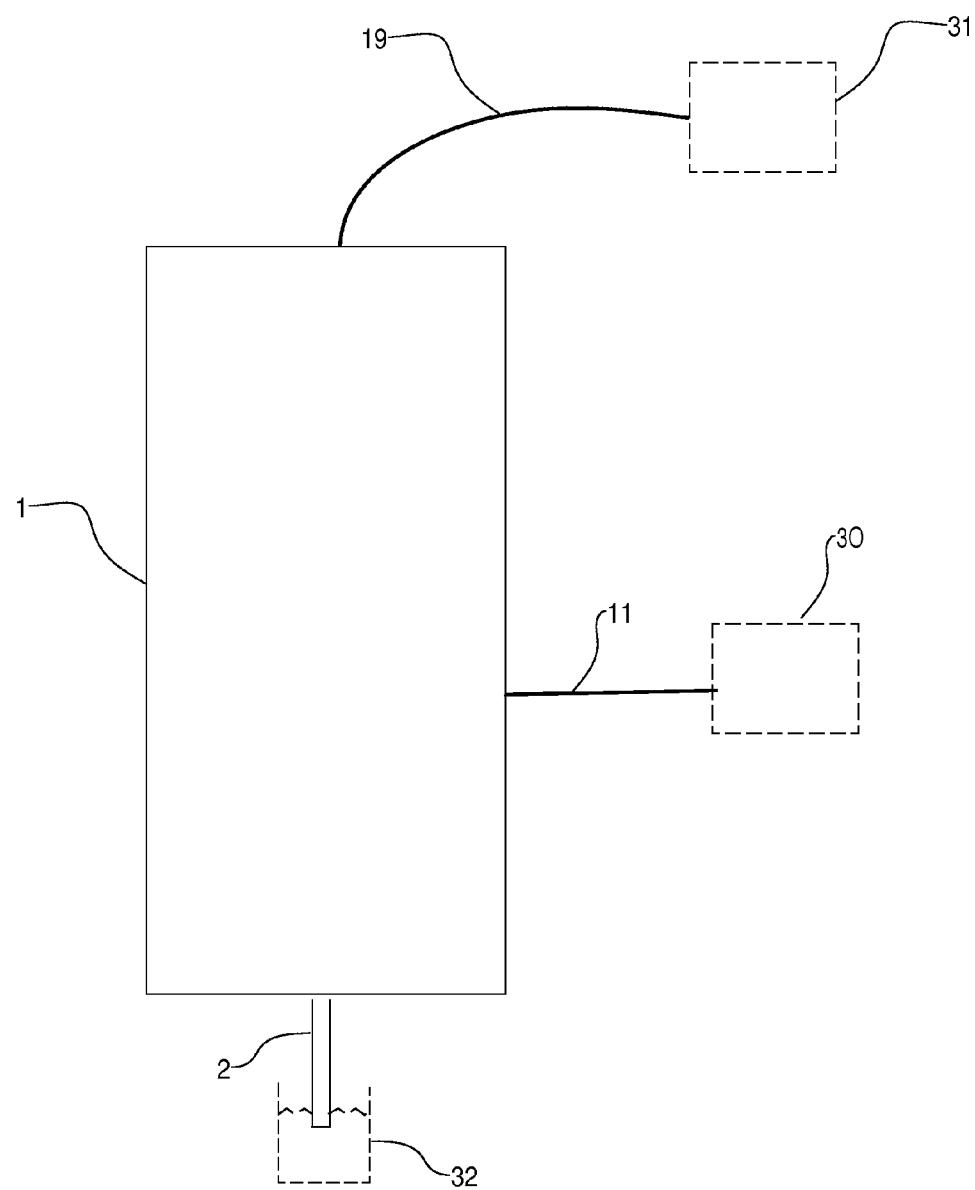
FIG. 3 is a schematic showing a typical arrangement for the use of the self-referencing Raman probe of the first embodiment of the current invention.

FIG. 3 shows schematically the deployment of the first embodiment of the self-referencing Raman probe in a measurement where the sample is a fluid sample 32. As shown, input optical fiber 11 is connected to excitation laser 30 and output optical fiber 19 is connected to spectrometer 31. The crystalline optical fiber probe head 2 is immersed in fluid sample 32. The part of Raman emission from the sample scattered in the generally backward direction is guided by the probe head 2 into the probe body 1. In the deployment of the second embodiment of the self-referencing Raman probe, the input optical fiber 11 and the excitation laser 30 are replaced by the excitation laser 20 mounted directly on the probe body 1, as shown in FIG. 2.

When the crystalline optical fiber is a c-axis sapphire fiber, three prominent Raman peaks—with frequency shifts of approximately 418 $cm^{-1}$, 578 $cm^{-1}$, and 751 $cm^{-1}$—will be observed. The basic idea is to record simultaneously at least one of the Raman peaks from the sapphire fiber along with at least one of the prominent Raman peaks from the component of interest in the sample. Any fluctuation in the excitation laser's output power, or changes in the optical alignment of components within the probe body and in the coupling of excitation light into the probe body as well as Raman signals into the spectrometer as a result of movements in the connecting fibers, will result in no change in the ratio of the two. On the other hand, any change in the component's concentration will be indicated by a change in that ratio.

Figure 4A:
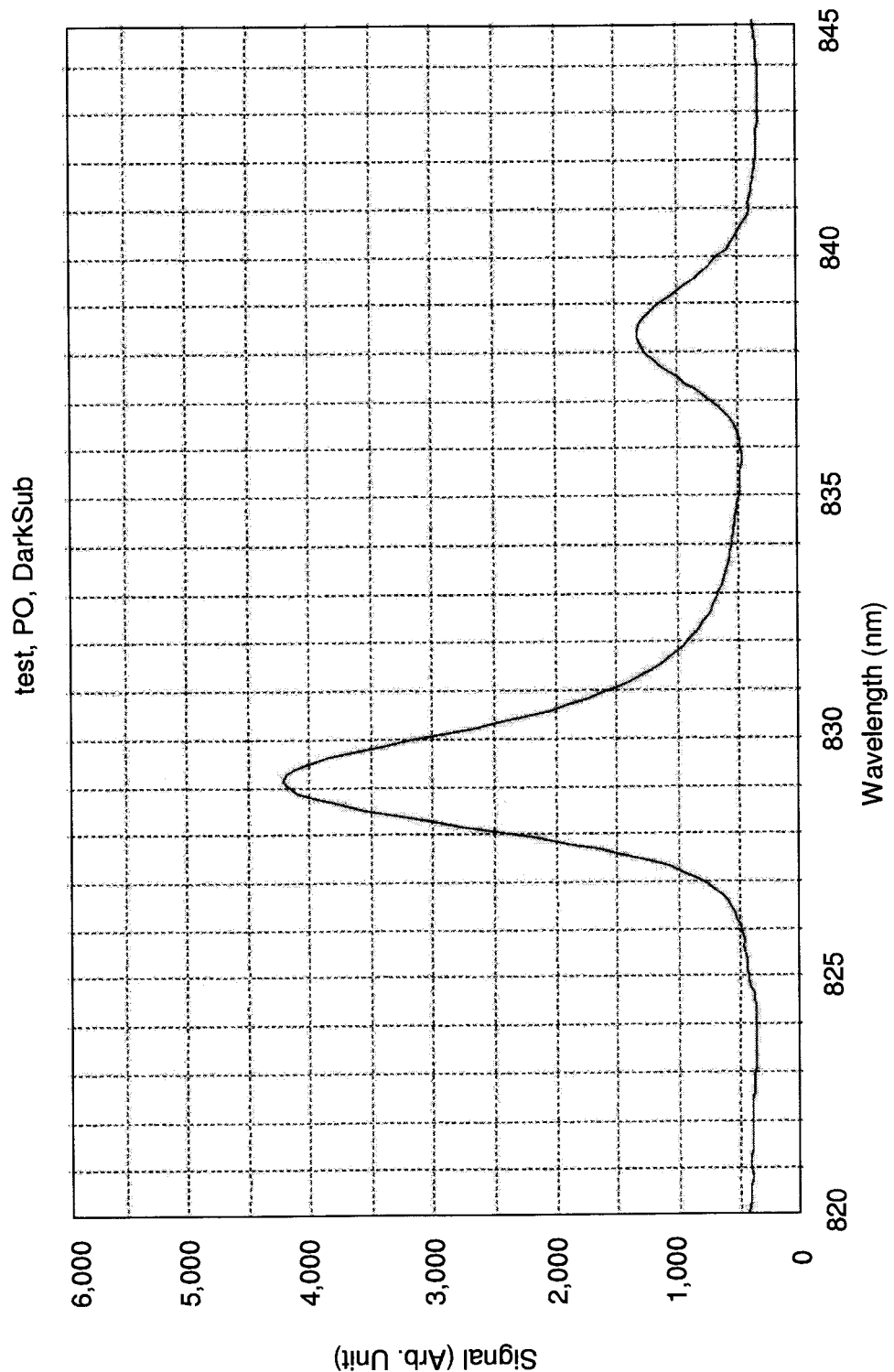
FIGS. 4a and 4b are spectra showing one of the Raman peaks of a sapphire fiber self-referencing Raman probe together with the Raman peak of ethanol in water at two different excitation laser power levels.
Figure 4B:
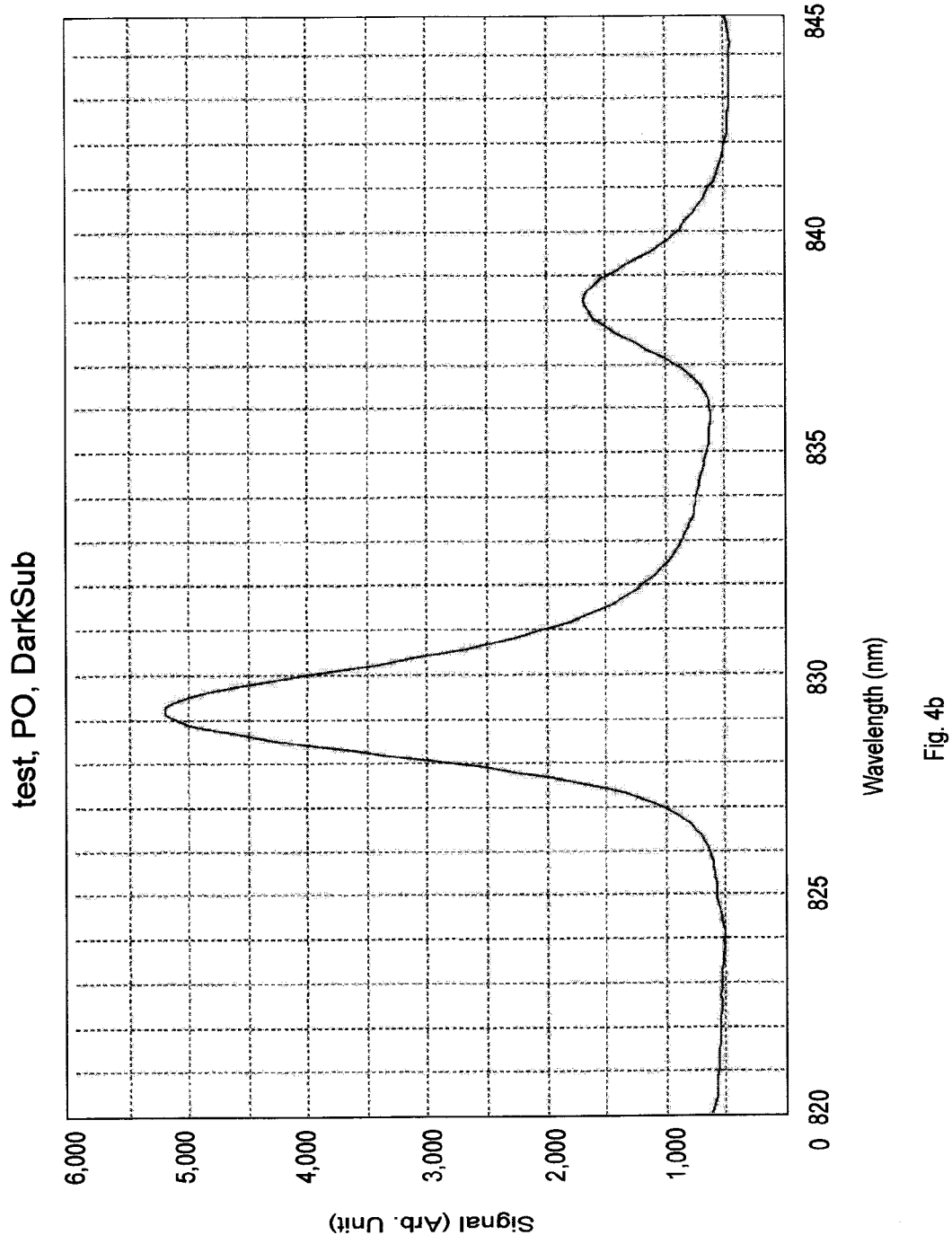

As an illustration, the Raman spectrum obtained from a sample consisting of a mixture of ethanol and water is shown in FIG. 4a. The peak on the left is produced by the sapphire fiber with a Raman shift of 751 $cm^{-1}$, while the one on the right is from ethanol with a shift of 880 $cm^{-1}$. FIG. 4b shows a similar spectrum after the power of the excitation laser at 780 nm was increased by approximately 20%. It is seen that both peaks got larger as a result. However, when the ratio of the two peaks is calculated, it is found that it is unchanged. On the other hand, for another mixture with a different ethanol concentration, the ratio of the two peak heights is found to be different. Once the ratio of the two peak heights has been determined for a sufficiently large number of ethanol concentrations, a calibration curve can be generated and the probe can be used to measure the concentration of ethanol in any unknown mixture of ethanol and water with a high degree of accuracy regardless of changes in the excitation laser power, coupling between the laser and the Raman probe, or coupling between the Raman probe and the spectrometer.

The disclosure presented herein two embodiments of the invention. These embodiments are to be considered as only illustrative of the invention and not a limitation of the scope of the invention. Various permutations, combinations, variations and extensions of these embodiments are considered to fall within the scope of this invention. Therefore the scope of this invention should be determined with reference to the claims and not just by the embodiments presented herein.

The invention claimed is:

1. A heat-sinking self-referencing Raman probe, said heat-sinking self-referencing Raman probe interfacing with an excitation laser through the use of an input optical fiber, with a spectrometer through the use of an output optical fiber, and with a sample; said heat-sinking self-referencing Raman probe adapted to producing a calibrated quantitative measurement of chemical composition of said sample, said heat-sinking self-referencing Raman probe comprising:

a probe head hosting a sapphire optical fiber, said probe head additionally interfacing with said sample and said sapphire optical fiber, having high thermal conductivity, serves as a heat sink for said sample;

a probe body comprising:
  a first port connected to said input optical fiber for receiving a laser beam from said excitation laser;
  a first lens which collimates said laser beam emerging from said input optical fiber;
  a beam splitter which redirects said laser beam, after collimation by said first lens, at a right angle;
  a connector which enables coupling to said probe head;
  a second lens producing a focused laser beam that is applied to said probe head, said probe head adapted to generate a first Raman emission from said sapphire optical fiber subsequently collected by said second lens, and guide said laser beam to said sample resulting in generating a second Raman emission from said sample, said probe head further guiding said second Raman emission through said sapphire optical fiber to be collected by said second lens which enables a common optical path that is shared by said first and said second Raman emissions on their way to said spectrometer for making possible the calibrated detection of said second Raman emission using said first Raman emission as a reference;
  a long-wave pass filter selected to reject light at laser wavelength and pass back-propagating Raman emissions from said sample and said sapphire optical fiber;
  a second port connected to said output optical fiber for interfacing with said spectrometer;
  a third lens receiving said back-propagating Raman emissions and focusing said back-propagating Raman emissions into said output optical fiber resulting in said Raman emissions being transmitted to said spectrometer, and said sapphire optical fiber making possible said calibration by providing a reference for making a quantitative determination of the sample chemical composition by simultaneously recording at least one Raman peak received from the sapphire optical fiber along with at least one Raman peak from a selected component in said sample and measuring their ratio.

2. A heat-sinking self-referencing Raman probe with a built-in excitation laser, said heat-sinking self-referencing Raman probe interfacing with a spectrometer through the use of an output optical fiber and with a sample; said heat-sinking self-referencing Raman probe capable of producing a calibrated quantitative measurement of chemical composition of said sample, said heat-sinking self-referencing Raman probe comprising:

a probe head hosting a sapphire optical fiber, said probe head additionally interfacing with said sample and said sapphire optical fiber, having high thermal conductivity, serves as a heat sink for said sample;

a probe body comprising:

said built-in excitation laser;

a first lens which collimates laser beam emitted by said built-in excitation laser;

a beam splitter which redirects said laser beam, after collimation by said first lens, at a right angle;

a connector which enables coupling to said probe head;

a second lens producing a focused laser beam that is applied to said probe head, said probe head adapted to generate a first Raman emission from said sapphire optical fiber subsequently collected by said second lens, and guide said laser beam to said sample resulting in generating a second Raman emission from said sample, said probe head further guiding said second Raman emission through said sapphire optical fiber to be collected by said second lens which enables a common optical path that is shared by said first and said second Raman emissions on their way to said spectrometer for making possible the calibrated detection of said second Raman emission using said first Raman emission as a reference;

a long-wave pass filter selected to reject light at laser wavelength and pass back-propagating Raman emissions from said sample and said sapphire optical fiber;

a port connected to said output optical fiber for interfacing with said spectrometer;

a third lens receiving said back-propagating Raman emissions and focusing said back-propagating Raman emissions into said output optical fiber resulting in said Raman emissions being transmitted to said spectrometer, and said sapphire optical fiber making possible said calibration by providing a reference for making a quantitative determination of the sample chemical composition by simultaneously recording at least one Raman peak received from the sapphire optical fiber along with at least one Raman peak from a selected component in said sample and measuring their ratio.

* * * * *